United States Patent [19]
Sugimoto

[11] Patent Number: 6,083,621
[45] Date of Patent: Jul. 4, 2000

[54] BIODEGRADABLE PLASTIC PRODUCT MADE FROM COCONUT HUSK FIBER POWDER MIXTURE

[76] Inventor: Ichiro Sugimoto, 1-1-26, Minami-Tsukushino, Machida City, Tokyo, Japan

[21] Appl. No.: 09/024,678

[22] Filed: Feb. 17, 1998

Related U.S. Application Data

[63] Continuation-in-part of application No. 08/754,672, Nov. 21, 1996, abandoned.

[30] Foreign Application Priority Data

Jan. 23, 1996 [JP] Japan ................................. 8-027417
May 7, 1996 [JP] Japan ................................. 8-135678

[51] Int. Cl.[7] .............................. D02G 3/00; C08J 6/00; C08J 3/00; C08J 1/00; C08K 5/00
[52] U.S. Cl. ................... 428/378; 428/375; 523/124; 523/128; 524/13; 524/47; 524/702
[58] Field of Search .......................... 428/373, 374, 428/375, 378; 524/433, 45, 702, 13, 35, 47; 525/337; 523/128, 124

[56] References Cited

U.S. PATENT DOCUMENTS

| | | | |
|---|---|---|---|
| 5,221,781 | 6/1993 | Aida et al. | 524/433 |
| 5,310,782 | 3/1994 | Takiyama et al. | 524/706 |
| 5,324,794 | 6/1994 | Taka et al. | 525/440 |
| 5,368,794 | 11/1994 | Ou | 264/45.3 |
| 5,436,056 | 7/1995 | Takiyama et al. | 428/141 |
| 5,616,681 | 4/1997 | Itoh et al. | 528/279 |
| 5,663,216 | 9/1997 | Tomka | 523/128 |
| 5,714,569 | 2/1998 | Imaizumi et al. | 528/272 |
| 5,817,381 | 10/1998 | Chen et al. | 428/34.8 |
| 5,895,611 | 4/1999 | Geltinger et al. | 264/45.3 |

FOREIGN PATENT DOCUMENTS

| | | | |
|---|---|---|---|
| 4027786 A1 | 4/1992 | Germany | A23K 1/14 |
| 4402912 A1 | 11/1994 | Germany | F16L 59/00 |
| 61-42556 | 3/1986 | Japan | C08L 61/06 |
| 62-160051 | 7/1987 | Japan | H02K 5/02 |
| 1-72836 | 3/1989 | Japan | B29C 67/20 |
| 7-150007 | 6/1995 | Japan | C08L 61/00 |
| 1520844 | 8/1978 | United Kingdom | C08K 11/00 |

OTHER PUBLICATIONS

Hammel, K.E., "2 Fungal Degradation of Lignin", United States Department of Agricultural paper, pp. 33–45, 1997.
"Ullmann's Encyclopedia of Industrial Chemistry," eds. Evers, Hawkins, and Schulz, VCH Publishers, pp. 501–502, (1992), May 1994.

*Primary Examiner*—William Krynski
*Assistant Examiner*—Chris Cronin
*Attorney, Agent, or Firm*—Morrison Law Firm

[57] ABSTRACT

Processed plant fine fibers such as those from the mesocarp of a coconut together are blended with a biodegradable plastic to produce a biodegradable plastic product that can be further made into other items. Plastics thus made from coconut husk fine fiber powder will return to the environment after disposal much more rapidly than those without coconut husk fine fiber powder. In the process, a dry compressed plant fine fiber powder is created from fine fibers of the coconut mesocarp. An example product created from this raw material is composed of 10 to 40% by weight of dry coconut husk powder mixed with environmentally degradable plastic. Environmentally non-degradable plastic may be added to the dry powder as a biodegradation rate modulator to create a modified raw material with a modified biodegradation rate. Plastic additives, standard in the industry, can be added to achieve additional desired properties. For example, a surface active agent may be added in order to increase the degree of processability; a colorant may be added to increase marketability; pesticides may be added as needed in order to protect the product or the soil in which the product is disposed from insects; and/or polymerization modifiers such as cross-linkers, monomer derivatives, heteromonomers, curing agents, etc. may be utilized to vary the properties of the base plastic.

11 Claims, 8 Drawing Sheets

BIODEGRADABLE PLASTIC PRODUCT MADE FROM COCONUT HUSK FIBER POWDER MIXTURE

This is a continuation-in-part of application Ser. No. 08/754,672, filed Nov. 21, 1996.

BACKGROUND OF THE INVENTION

The present invention relates to biodegradable plastics. More specifically, the present invention relates to biodegradable plastics having an enhanced rate of biodegradability resulting from the presence of compressed powdered plant fiber such as, for example, fine fiber from coconut mesocarp. In particular, the present invention relates to an improvement in biodegradable plastics wherein the biodegradability is made predictable by blending conventional polymers, biodegradable polymers and biodegradability enhancing compressed plant fine fiber powder having moisture expansion characteristics capable of generating structure disrupting internal mechanical forces upon prolonged exposure to the environment. In other words, the present invention relates to plastics which decompose in the soil after use.

Because of environmental issues facing society, environmentally degradable plastics are increasing in popularity. The biodegradable plastics currently developed are divisible into four categories that somewhat overlap: a) the natural polymers which use polysaccharides such as starch and the like; b) the microbial polyesters which use the biological activity of microorganisms; c) blends with accelerated degradation properties which are regular plastics with degradation accelerator additives; and d) chemical synthetics which include the aliphatic polyesters and the like.

Depending on the particular properties of the different materials, biodegradable plastics are used as raw materials for disposable products and in products that generally do not have to carry heavy loads. Such applications include: agricultural products such as films, sheets, bottles, pots, and bags; products for daily use and tableware such as trays, cases, and straws; some medical equipment; and sports equipment. Nonetheless, the use of biodegradable plastics is still limited and their effect on the general plastics industry as a whole is limited.

A review of the "state of the art" for environmentally degradable polymers is found in: "Encyclopedia of Chemical Technology" 4th edition, Vol. 19, Pages 968–1004, John Wiley & Sons Inc. (1996), the entirety of which is incorporated herein by reference. Additionally, a review of manufacturing processes and testing procedures in current use, in: "Encyclopedia of Chemical Technology" 4th edition, Vol. 19, Pages 290–347, John Wiley & Sons Inc. (1996), is incorporated herein, in its entirety, by reference.

Biodegradable plastic offers promise to solve the problem of the disposal of regular plastic. But there have been several obstacles. Depending on the type and ratios of the components in the biodegradable plastic and depending on the environment where the biodegradable plastic is disposed, the rate of biodegradation may be less than desired. Another obstacle is that as the thickness of the product containing biodegradable plastic increases, the biodegradability property is diminished. Furthermore, the life span of the product containing biodegradable plastic might be detrimentally shortened as a result of insects causing damage. A greater problem still is that many polymers are specifically formulated to serve narrow optimized functions, or to display certain manufacturing process behaviors. Substitution with a biodegradable plastic diminishes the effectiveness of these processes and generates an inferior final product. It would therefore be highly advantageous to formulate a way to improve the biodegradability of all plastics while maintaining each plastic's desirable features.

One possibility for achieving this goal would be through the use of an additive to the plastic, in place of currently used common fillers, that increases the plastic's susceptibility to environmental degradation. Additives to plastics are currently used to obtain desirable properties in the plastic. For example, additives are used to impart such properties as strength, hardness, flexibility, color, etc. An extensive review of properties, applications, and toxicologies of additives for plastics is found in: "Chemical Additives for the Plastics Industry", prepared by Radian Corp., Noyes Data Corp, N.J. (1987), the entirety of which is incorporated herein by reference. One possibility of a plastic additive to increase environmental degradability may be a biomaterial such as plant fiber or wood powder.

Figure 2A:
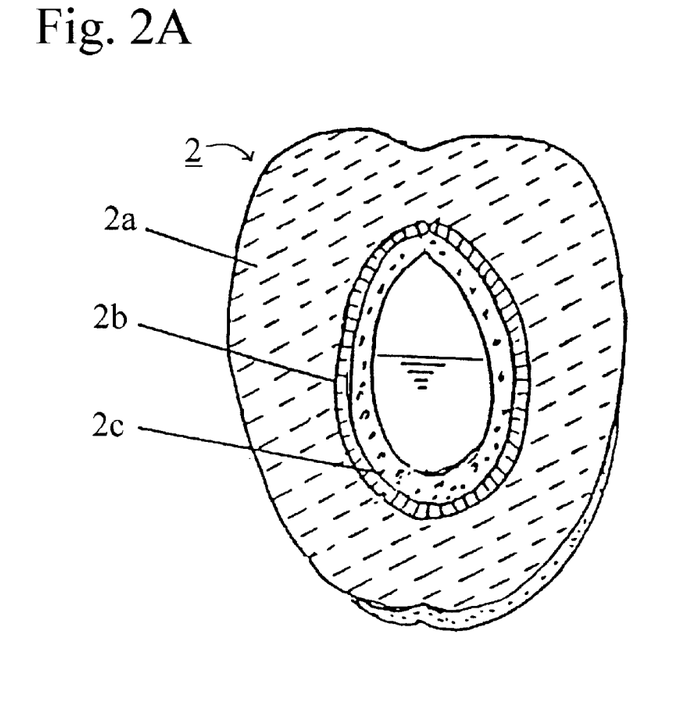
FIG. 2A is a side cross-section drawing of a coconut.

Palms, particularly coconut palms, bear fruit and are widely cultivated in the tropics. The palms have been traditionally used in various ways. Referring to FIG. 2A, a view of a coconut 2, taken in longitudinal section, shows an endosperm 2c which has a typical thickness of 10 to 20 mm and is generally used for coconut oil, food, or as raw material for medicines. A hard, woody endocarp 2b, commonly known as the shell, typically has a thickness of 2 to 6 mm. The coconut shell is useful for making a good quality industrial grade of activated carbon. A mesocarp 2a, commonly called the husk, forms the largest part of the coconut fruit, with a typical thickness of 30 to 40 mm. However, the fibers within the mesocarp are used currently only to make string and rope and are not generally used for anything else.

Figure 2B:
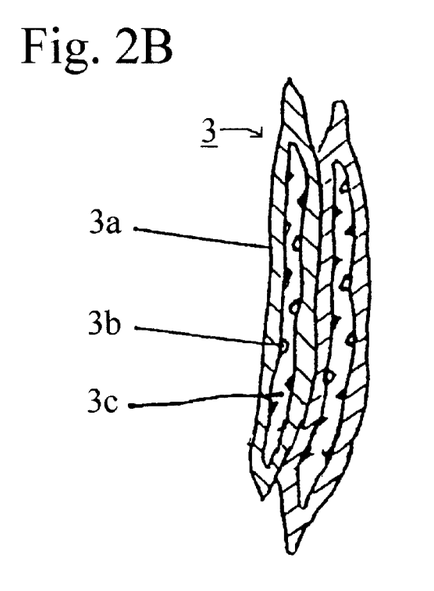
FIG. 2B is an magnified cross-section of a coconut mesocarp fiber.

Referring to FIG. 2B, a coconut fiber 3, from mesocarp 2a is seen in a radial cross-section. Coconut fiber 3 is classified botanically as a sclerenchymatous fiber. Typically, coconut fiber 3 is approximately 0.7 mm long and 20 micrometers wide. Structurally, the fiber includes an inner membrane 3a, saw tooth projections 3b, and a hollow pit 3c. Physically, coconut fiber 3 is light, hard, and resilient. Thermally, coconut fiber 3 is a poor conductor of heat. Furthermore, coconut fiber 3 is durable against water and air (Shoichiro Nagai, *Inorganic and Organic Industrial Material Handbook* p. 788, (S35, 3, 20) 1st edition, published by Toyo Keizai Shinposha, the entirety of which is herein incorporated by reference).

After being compressed, coconut fiber 3 also has the characteristic that its volume increases by 5 to 6 times when water is added. This phenomenon is hypothesized to be a result of the compressed dried fibers having original shape memory, with inner membrane 3a returning to its maintenance state at the cellular level. It is therefore postulated that the expandability characteristics of this and other plant fibers may impart a useful enhancement to plastic biodegradation processes.

Figure 2C:
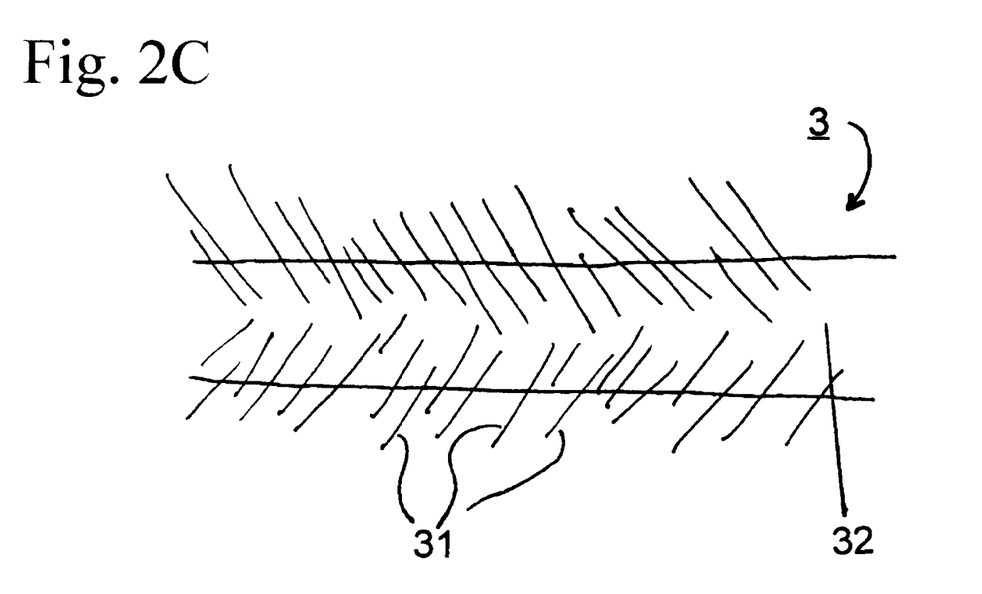
FIG. 2C is a magnified longitudinal cross-sectional view of a coconut mesocarp fiber.

Referring now to FIG. 2C, coconut fiber 3 has a dense growth of beard-like fine fibers 31 around a trunk 32. Fine fibers 31 drop off from trunk 32 under normal conditions when normal coconut fibers 3 are collected and manufactured into, for example, rope. Fine fibers 31 are often themselves collected and used to improve cultivating soil in Europe.

Fine fibers 31 contain a large amount of hemicellulose, which attracts microorganisms. Trunk 32, in contrast, contains large amounts of phenolic lignin, which acts to repel microorganisms. Under normal conditions, unprocessed coconut fibers 3 would not attract microorganisms, due to the presence of phenolic lignin in coconut trunk 32. Therefore, the use of unprocessed coconut fibers 3 does not enhance biodegradation of plastics incorporating such fibers.

OBJECTS AND SUMMARY OF THE INVENTION

An object of the present invention is to increase the biodegradability of traditional biodegradable plastic.

Another object of the present invention is to increase the biodegradability of traditional biodegradable plastic without sacrificing processing properties that lead to good molding, extruding, and casting.

A further object is to make possible the modulation of the biodegradation rate of the final processed product.

Yet another object is to make possible the modulation of the biodegradation rate of the final processed product to control the biodegradation rate of the product.

Yet another object is to make possible the modulation of the biodegradation rate of the final processed product, to control the biodegradation rate of the product in different sections of the product, in order to control the relative biodegradation rates in the different sections.

A still further object is to utilize at an industrial production level the coconut fine fibers which have little use and are largely unnecessarily discarded.

Yet a still further object of the present invention is to provide a biodegradable product which has a pesticide function in order to control premature damage caused by pests.

Yet another object of the present invention is to provide a biodegradable product which has a pesticide function in order to provide a controlled release of pesticide into the soil in which the biodegradable product is disposed to control pests.

Briefly stated, fine fibers from the mesocarp fibers of a coconut and a biodegradable plastic are blended as an industrial material to provide a biodegradable plastic product made from coconut husk fine fiber powder that will return to the environment after disposal. A dry powder is created from fine fibers of the coconut mesocarp fibers. A product is created from a raw material which is composed of 10 to 40% by weight of dry coconut husk powder mixed with biodegradable plastic. A non-degradable plastic may be added to the dry powder as a biodegradation rate modulator to create a modified raw material with a modified biodegradation rate. Plastic additives, standard in the industry, can be added to achieve desired properties. For example, a surface active agent may be added in order to increase the degree of processability; colorant may be added to increase marketability; pesticides may be added as needed in order to protect the product or the soil in which the product is disposed from insects; and/or polymerization modifiers such as cross-linkers, monomer derivatives, heteromonomers, curing agents, etc. may be utilized to vary the properties of the base plastic.

According to an embodiment of the present invention, a biodegradable plastic product comprises from about 95 to about 60% by weight of a biodegradable plastic, and from about 5 to about 40% by weight of a dried powder, the dried powder including fine fibers of a coconut mesocarp.

According to another embodiment of the present invention, a biodegradable plastic product comprises from about 90 to about 60% by weight of a biodegradable plastic, from about 10 to about 40% by weight of a dried powder, the dried powder including fine fibers of a coconut mesocarp, and from about 1 to about 2% each by weight of at least one member selected from the group consisting of a surface active agent and a pesticide.

According to another embodiment of the present invention, a biodegradable plastic product comprises from about 85 to about 50% by weight of a biodegradable plastic, from about 10 to about 40% by weight of a dried powder, the dried powder comprising fine fibers of a coconut mesocarp, and from about 5 to about 10% by weight of a colorant.

According to another embodiment of the present invention, a biodegradable plastic product comprises from about 90 to about 20% by weight of a biodegradable plastic, from about 5 to about 40% by weight of a non-biodegradable plastic, and from about 5 to about 40% by weight of a dried powder, the dried powder comprising fine fibers of a coconut mesocarp.

According to another embodiment of the present invention, a method of making a biodegradable plastic product comprises the steps of separating a fine fiber component from a coconut, removing substantially completely a contaminant component from the fine fiber component, the contaminant component comprising at least one of a salt and a tannin, to produce a cleaned fine fiber mass, drying the cleaned fine fiber mass to a water content of less than about 10 wt % to produce a dried fine fiber mass, compressing the dried fine fiber mass to produce a compressed fine fiber mass, processing the compressed fine fiber mass to produce a powder having particle lengths of from about 10 to about 80 microns, drying the powder to a water content of less than about 3 wt % to produce a dried powder, making a mixture of from about 95 to about 60% by weight of a biodegradable plastic, and from about 5 to about 40% by weight of the dried powder, and forming the biodegradable plastic product.

According to another embodiment of the present invention, a method of making a biodegradable plastic product comprises the steps of making a mixture of from about 95 to about 60% by weight of a biodegradable plastic, and from about 5 to about 40% by weight of a dried powder, wherein the dried powder comprises fine fibers of a coconut mesocarp, and forming the biodegradable plastic product.

According to another embodiment of the present invention, a method to make a biodegradable plastic product comprises the steps of separating a fine fiber component from a coconut, removing substantially completely a contaminant component from the fine fiber component, the contaminant comprising at least one of a salt and a tannin, to produce a cleaned fine fiber mass, drying the fine fiber mass to a water content of less than about 10 wt % to produce a dried fine fiber mass, compressing the dried fine fiber mass to produce a compressed fine fiber mass, processing the compressed fine fiber mass to produce a powder having particle lengths of from about 10 to about 80 microns, drying the powder to a water content of less than about 3 wt % to produce a dried powder, making a mixture of from about 90 to about 20% by weight of a biodegradable plastic, from about 5 to about 40% by weight of a non-biodegradable plastic, and from about 5 to about 40% by weight of the dried powder, and forming the biodegradable plastic product.

According to another embodiment of the present invention, a method to make a biodegradable plastic product comprisies the steps of making a mixture of from about 90 to about 20% by weight of a biodegradable plastic, from about 5 to about 40% by weight of a non-biodegradable plastic, and from about 5 to about 40% by weight of a dried powder, wherein the dried powder comprises fine fibers of a coconut mesocarp, and forming the biodegradable plastic product.

According to another embodiment of the present invention, an environmentally degradable plastic comprises at least one polymer, and a compressed plant fine fiber powder.

According to another embodiment of the present invention, an environmentally degradable molded plastic product comprises 95–60% by weight of an environmentally degradable plastic, and 5–40% by weight of compressed dried powdered coconut husk fine fibers.

According to another embodiment of the present invention, an environmentally degradable plastic product comprises 95–60% by weight of an environmentally degradable plastic, 5–40% by weight of compressed dried powdered coconut husk fine fibers, and 5–40% by weight of an environmentally non-degradable plastic.

The present invention is a product composed of 95 to 60% by weight of a biodegradable plastic and 5 to 40% by weight of a dried and compressed powder from fine fibers derived from coconut mesocarp (hence referred to as coconut powder). If a colorant or surface active agent is included, it is preferable that 1 to 2% by weight of a surface active agent or 5 to 10% by weight of a colorant is added to the above mixture. For use as an agricultural film, the above mixtures can be further improved by adding 1 to 2% by weight of a pesticide. By including 10 to 40% by weight of a non-biodegradable plastic, the rate of biodegradation of the product can be modulated as needed.

The biodegradable plastic product of the present invention can also be used as agricultural materials, construction materials, electronic appliance parts, automobile parts, and stationery. The material of the present invention breaks down by biodegradation in landfills to water and carbon dioxide, thereby minimizing the space taken up and extending the life of the landfill. Furthermore, the present invention may be easily composted or incinerated. The present invention produces little smoke, no foul odors, and no toxic gases upon incineration. the present invention can be used in the form of a film, such as in compost bags, garbage bags, and the like.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1A:
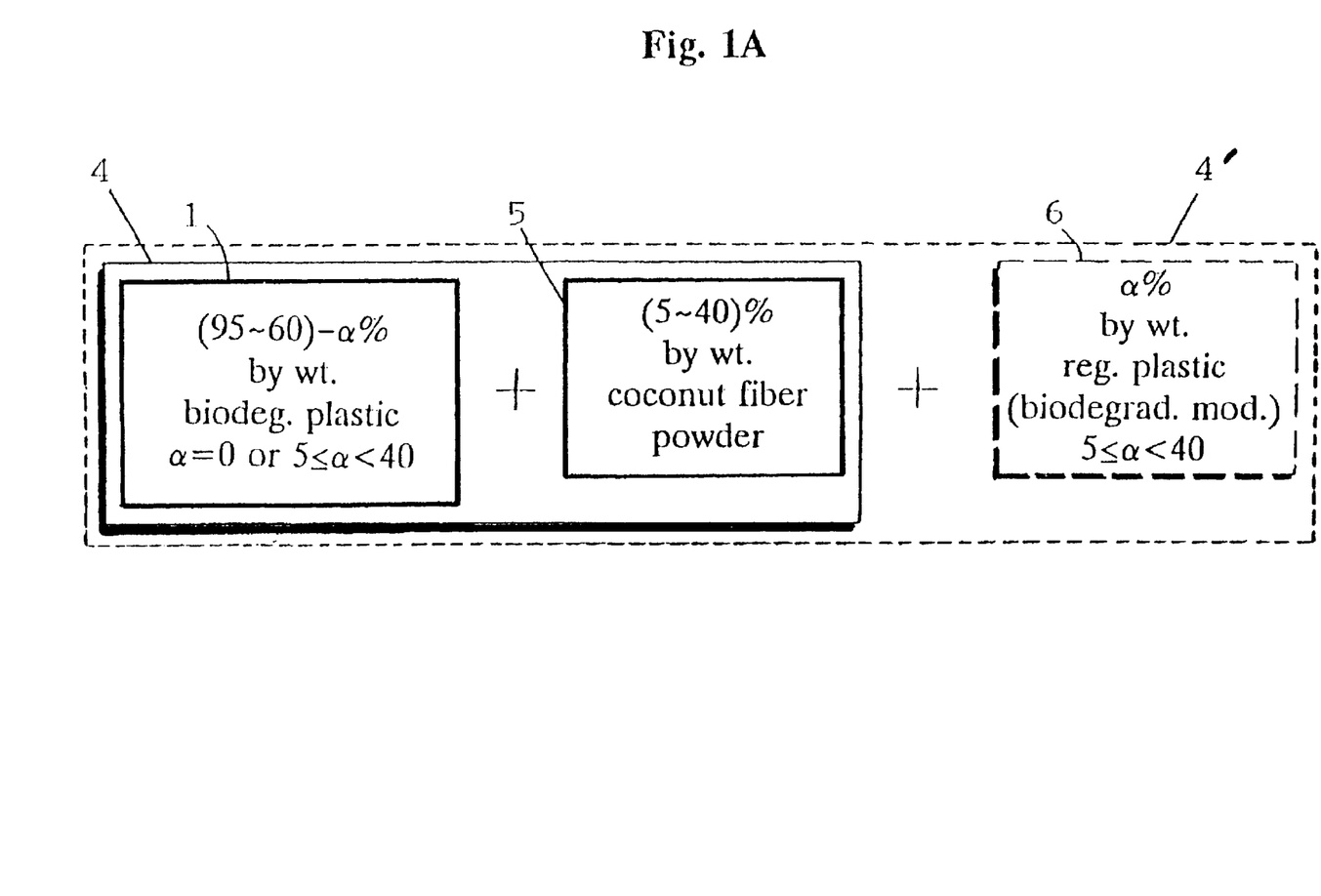
FIG. 1A is a block diagram describing the material, of a coconut husk fine fiber powder mixture, of the present invention.

Referring to FIG. 1A, an example of a biodegradable plastic utilizing the present invention as a component is constituted of a biodegradable plastic 1 blended with a coconut fine fiber powder 5 and an optional regulating plastic 6. Optional regulating plastic 6 can be considered a biodegradability modifier.

The amounts of each constituent are, as shown in FIG. 1A:

1) a biodegradable plastic 1: about 95 to about 60 weight percent minus $\alpha$ weight percent; wherein $\alpha$=zero, or a is between about 5 and about 40.

2) a coconut fine fiber powder 5: about 5 to about 40 percent by weight;

3) a regulating plastic 6: $\alpha$ weight percent, wherein $\alpha$=zero, or $\alpha$ is between about 5 and about 40.

A mixture 4 comprises the blend of biodegradable plastic 1 and coconut fine fiber powder 5, while a modulated mixture 4' comprises the blend of biodegradable plastic 1, coconut fine fiber powder 5, and regular non-biodegradable plastic 6.

Figure 1B:
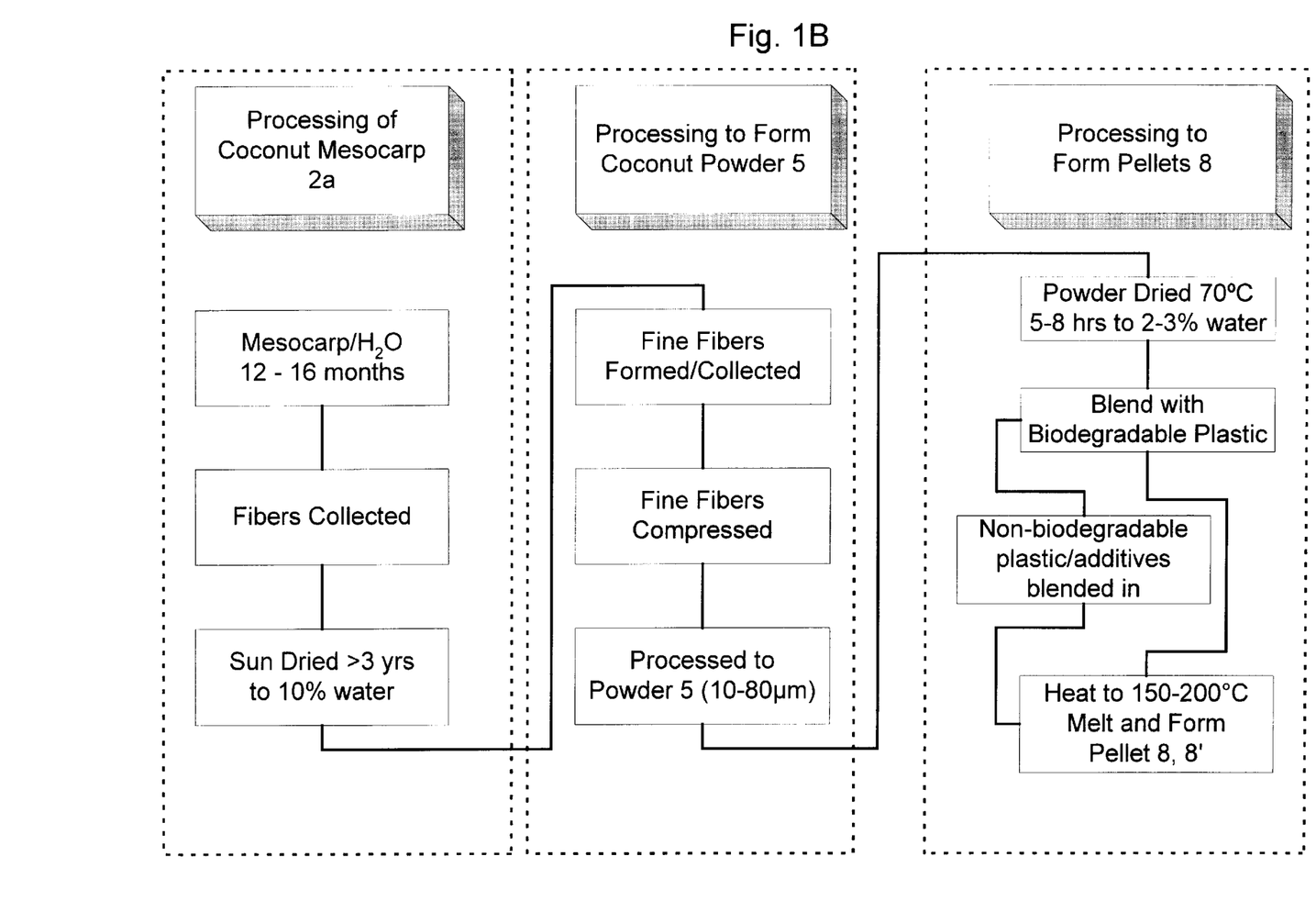
FIG. 1B is a block diagram describing the production steps to make the biodegradable plastic product of the present invention from a coconut husk fiber powder mixture.

Referring to FIG. 1B, the production method for biodegradable plastic involves three subprocesses: a) a processing 9 of coconut mesocarp 2a into fine fibers, b) a processing 10 of fine fibers into compressed fine fiber powder, and c) a mixing 11 of powder with plastic to form pellets.

Processing 9 of coconut mesocarp 2a into fine fibers involves extracting and collecting the fine fibers from the flesh, removing salts and tannins from the collected fine fiber, and substantially drying the resulting fine fibers.

As an example of processing 9, mesocarp 2a (hereinafter referred to as "coconut husk") of coconut 2 is first put through a step of soaking 12. In step of soaking 12, coarsely chopped coconut husk is exposed to fresh water for about 12–16 months. After step of soaking 12, the flesh has dissolved and only the fibers remain. Next a step of collecting fibers 13 includes gathering the fibers and laying them out where they are exposed to the sun. A subsequent step of sun drying 14 includes allowing the collected fibers to be bleached and dried in the sun for over three years to remove the salt and tannins. The end of the step of sun-drying includes a final drying step wherein hot air is forced over the sun-dried fibers for approximately 8 hours. The step of hot air drying reduces the moisture content of the fibers to approximately 10%.

The processing of rope, the usual application for the coconut husk fiber, also uses the above process. Although the total time is long for the above processing example, coconuts are generally found in areas without extensive energy sources other than the sun. Hence, the cost of production of the coconut fiber powder is very low because of the very low associated energy costs. It is apparent that the steps can be accelerated with more energy consumption. For example, pressure treatment of the coconut mesocarp will accelerate fiber separation.

Processing 10 to form a coconut powder 5 includes a step of forming (or collecting) fine fibers 15 from the processed fibers of the above processing 9. Fine components that are the residue from rope processing can be collected. The collected fine fibers from step 15 are then subjected to a step of compressing 16. The step of compressing includes gathering the fine fibers into bundles and subjecting them to a pressure sufficient to reduce their volume to about ⅕th to ⅙th of their original volume. The compressed fine fiber mass is further processed by a step of milling 17, for example, by further chopping or milling to obtain coconut powder 5 which consists of short fine fibers that are about 10–80 micrometers long.

Following processing 10, a mixing 11 includes first a step of drying 18. In step of drying 18, coconut powder 5 is dried with hot air for about 5–8 hours at 105° C. As a result, the water content of coconut powder 5 is further reduced to about 2–3%. Next, in a step of blending 19, coconut powder 5 is blended with biodegradable plastic at a ratio of about 5 to 40% by weight. The blend is then submitted to a step of pelleting 21. As shown by the solid arrow, the powder at this stage is heated to about 150–200° C. The temperature causes melting of the blend. After the blend is melted, it is cooled and pelletized to form a pellet 8.

Alternatively, as indicated by the dashed arrow step of blending 19 is supplemented with a step of blending additives 20 wherein, for example, a non-biodegradable plastic or additive can be added into the blend before the pellet forming final step of pelleting 21. This results in a modified pellet 8'. Further, in the materials for pellet 8', 1–10% of an adjuvant such as, for example, a surface active agent, a pesticide, a colorant, a mold release agent, or a dispersant is added as needed.

In biodegradable plastic 1 of the present invention, a surface active agent may be added in order to improve the blending of the components and to improve the mold release. Desired colorants may be added to obtain differentially colored products. Pesticides, herbicides, etc. may be added to avoid premature damage to the final product from soil bacteria, or to effect a time release into the environment. In order to improve the uniformity of the mix components, a dispersant can also be added to the blend. Other additives such as reinforcing agents, special modifiers, plasticisers, etc. as are normally added to plastics to impart special characteristics to the product may also be added the plastic product at the appropriate stage in the process.

In the product of the present invention, a suitable amount of pellet 8 is used as the raw material. Depending on the type of product, and its shape, film thickness, and the like, the biodegradable plastic of the present invention can be used in agriculture or fishing, products for daily use, construction, medical hygiene, or sports and the like, as films, sheets, boards, molded goods, wrapping material, or covering material. Production is by any convenient forming means such as for example, injection molding, extrusion molding, calendar molding, cast processing, blow molding, vacuum molding, and lining processing. In the examples herein described, it is generally desirable for the heating temperature to be under about 140–200° C. Further, forming can include such processes as cutting and stamping after the hot processes have cooled.

After use, the biodegradability of the product of the present invention is dramatically increased, as compared to a pure biodegradable plastic alone, when left in soil, sludge, compost, or in water with microorganisms. The biodegradable plastic includes any biodegradable plastic suitable for a particular application. For example, aliphatic polyesters such as lactic acid resins, and acetate-based aliphatic acid resins such as resins of carbonic acid esters, are suitable for many applications.

When a crack is formed in the product of the present invention by, for example, microorganisms, water infiltrates through the crack. Compressed coconut powder 5 absorbs this water and greatly expands to create an internal breaking pressure. This internal stress destroys the gross structural integrity of the plastic product, creating numerous microfissures and extensive reticulate formation. Microorganisms can subsequently enter the reticulate microenvironment through these cracks and microfissures, accelerating the breakdown. This mechanism is thought to create a microenvironment where the activity of microorganisms against the biodegradable plastic component of the present invention is selected.

There are more microorganisms which favor the coconut powder 5 than the plastic component because coconut powder 5 is a natural organic substance. Hence, such microorganisms' breakdown of the coconut powder component of the present invention precedes the breakdown of the plastic component. In theory, this enhances the bacterial load within the plastic structure and creates a natural selection pressure of an increasing bacterial load, a diminishing local nutrient source (the coconut fiber), and an alternative nutrient source (the plastic polymer) available only to those strains that also have the enzymatic capability to degrade and utilize the plastic polymer. Thus, the overall form of the plastic product is destroyed first greatly increasing the likelihood of polymer degrading microorganisms being available in the presence of the basic polymer.

Embodiment 1

In an embodiment 1 of the present invention, 10% by weight of coconut powder of fine fiber lengths of about 20–80 micrometer is mixed with a biodegradable aliphatic polyester. The biodegradable polyester is composed of glycol and aliphatic carboxylic acid at a ratio of 30:70 by weight. For testing purposes, with an injection molding device, a seedling pot of thickness 0.5 mm was molded at 140–200° C.

Embodiment 2

In an embodiment 2 of the present invention, 20% by weight of coconut powder of fine fiber lengths of about 20–80 micrometer is mixed with a biodegradable aliphatic polyester. The biodegradable polyester is composed of glycol and aliphatic carboxylic acid at a ratio of 30:70 by weight. For testing purposes, with an injection molding device, a seedling pot of thickness 0.5 mm was molded at 140–200° C.

Embodiment 3

Embodiment 3 is composed of 40% by weight of coconut powder and a biodegradable aliphatic polyester. The biodegradable aliphatic polyester is composed of 15% starch, 45% calcium carbonate, and 40% polycaprolactone. As in embodiments 1 and 2, an experimental sample was created.

Comparative embodiment 1

In a comparative embodiment 1, the aliphatic polyester used in embodiments 1 and 2 was used alone to create an experimental sample of the same width and size. Referring to Table 1, the results of an experiment comparing Comparative Sample 1 with Embodiments 1, 2, and 3, of the present invention are shown.

As the data shows, the biodegradability of the product of the present invention is much enhanced as compared with the comparative embodiment. Furthermore, improvement to the soil was enhanced. The ease of use of the material of the present invention was not detrimental in comparison to the comparative embodiment.

Figure 3:
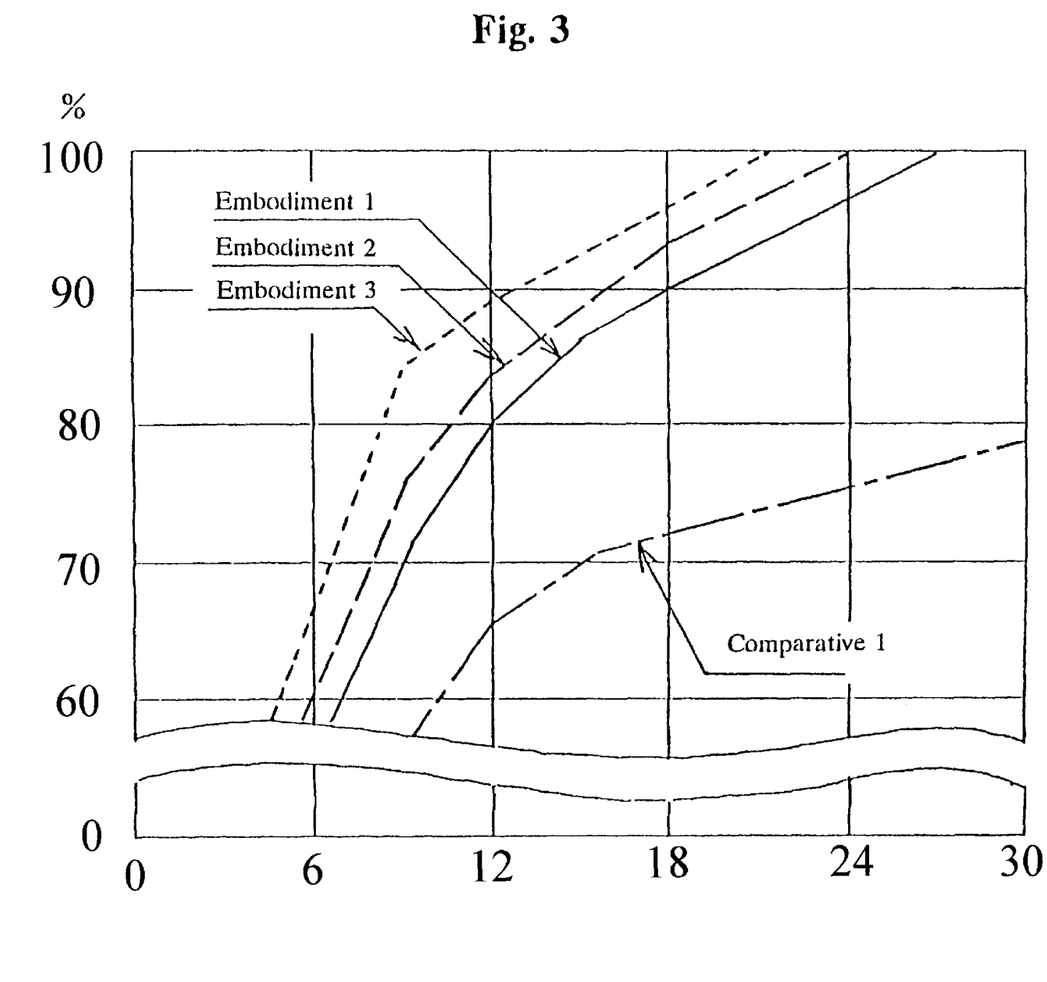
FIG. 3 is a graph showing the biodegradation progression of three embodiments of the present invention and a comparative embodiment.

Referring to FIG. 3, the progression of biodegradation over time in field soil of the above three embodiments is compared with that of the comparative sample. The vertical scale indicates the percent degradation and the horizontal scale indicates elapsed time in weeks.

As is apparent from FIG. 3, all of the embodiments of the present invention were significantly more biodegradable than the comparative embodiment. For example, Embodiments 1, 2, and 3 were 80% degraded at 9–12 months while the comparative sample took more than 30 months to reach 80% degradation. Among the embodiments, the embodiment with the highest ratio of coconut powder was the most biodegradable.

TABLE 1

|  | Embodiments | | | Comparative Embodiment |
| --- | --- | --- | --- | --- |
|  | 1 | 2 | 3 | 1 |
| Amount of coconut powder (weight %) | 10 | 20 | 40 | — |
| Consistency[1] | 1 | 1 | somewhat hard | Standard = 1 |
| Melting Pt (° C.) | 120 | 120 | 130 | 120 |
| Ease of Molding | A | A | A | A |
| Biodegradability[2] | 2.6 | 3 | 2.1 | 8 |
| Soil Improvement[3] | A | A | A | C |
| Overall Assessment[4] | A | A | A | B |

Figure 4A:
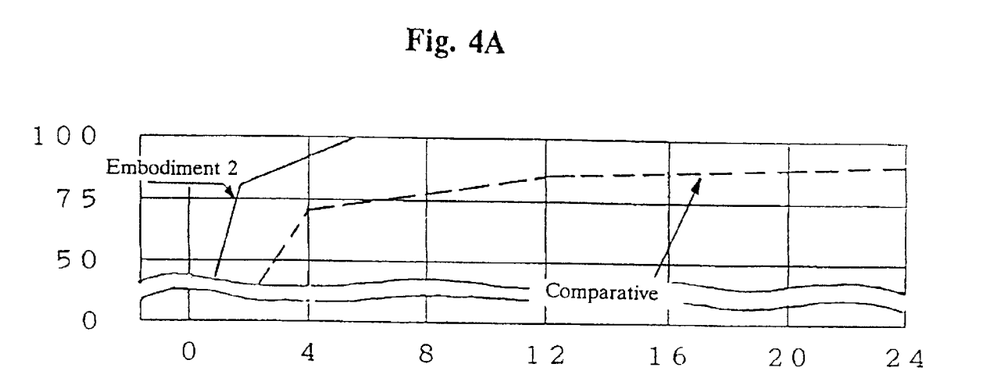
FIG. 4A is a graph showing the biodegradation progression of an embodiment of the present invention and a comparative embodiment in beach sand.

[1]Relative to Comparative Embodiment 1
[2]Number of months required for a seedling pot (0.5 mm) to be 80% degraded.
[3]Soil improvement for plant cultivation after breakdown of the product. A: excellent, B: good, C: no change, normal
[4]A: excellent, B: good, C: no change, normal Referring to FIG. 4A, there is shown the progression of biodegradation of embodiment 2 and the comparative embodiment in beach sand. The vertical scale indicates the percent degradation and the horizontal scale indicates elapsed time in weeks that the test samples were buried.

Figure 4B:
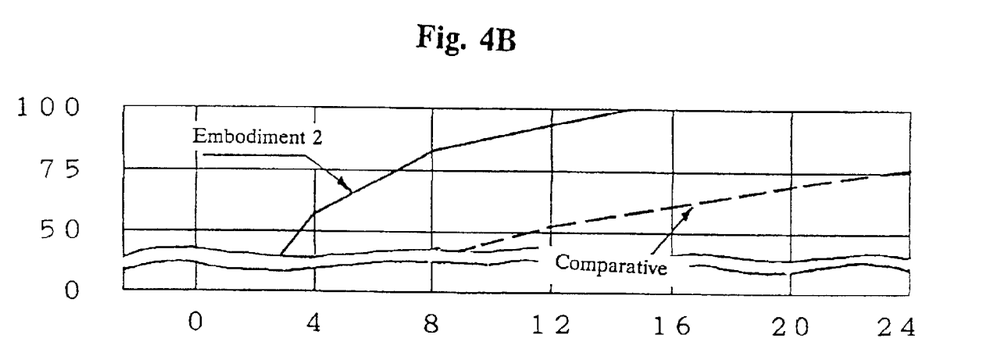
FIG. 4B is a graph showing the biodegradation progression of an embodiment of the present invention and a comparative embodiment in red-yellow soil.

Referring to FIG. 4B, there is shown the progression of biodegradation of embodiment 2 and the comparative embodiment in red-yellow soil (Aichi-ken type soil). The vertical scale indicates the percent degradation and the horizontal scale indicates elapsed time in weeks that the test samples were buried.

Figure 4C:
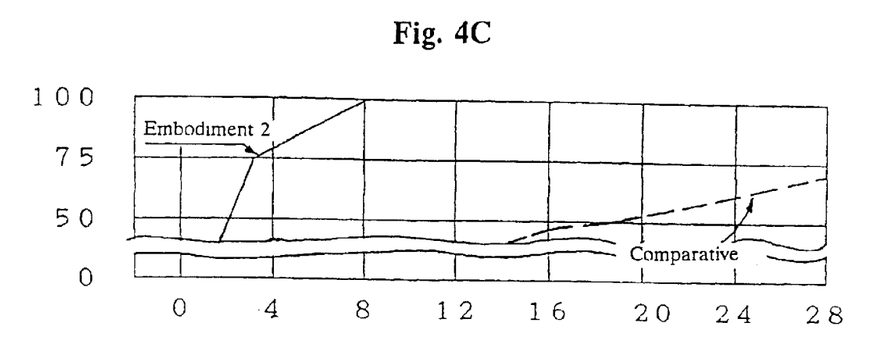
FIG. 4C is a graph showing the biodegradation progression of an embodiment of the present invention and a comparative embodiment in a grey soil of a paddy field.

Referring to FIG. 4C, there is shown the progression of biodegradation of embodiment 2 and the comparative embodiment in the grey soil of a paddy field. The vertical scale indicates the percent degradation and the horizontal scale indicates elapsed time in weeks that the test samples were buried.

Figure 4D:
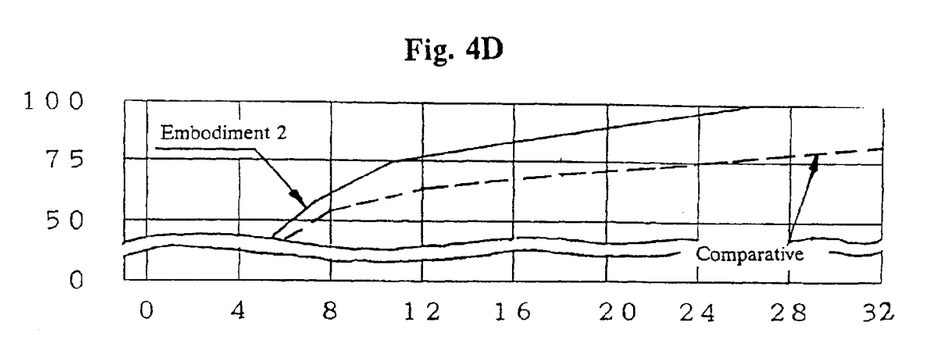
FIG. 4D is a graph showing the biodegradation progression of an embodiment of the present invention and a comparative embodiment in a black volcanic soil of a farm field.

Referring to FIG. 4D, there is shown the progression of biodegradation of embodiment 2 and the comparative embodiment in black volcanic soil found in farm fields. The vertical scale indicates the percent degradation and the horizontal scale indicates elapsed time in weeks that the test samples were buried.

Depending on the use required of the specific type of product, pellets formed of the above mixture might biodegrade too rapidly and, hence, may be disadvantageous. In order to address this problem, the present invention mixes regular plastic, that alone is non-biodegradable, in order to control the rate of degradation and to maintain the original shape for a set amount of time.

Referring to FIG. 1B, as shown by the dotted arrow, 5 to 40% by weight of a non-biodegradable plastic is mixed with mixture 4 of biodegradable plastic 1 and coconut powder 5 in the processing to form modified pellet 8'. This blended product is processed similarly to pellet 8 and produces modified pellet 8' (FIG. 1B).

Modified pellet 8' is especially advantageous for products with thickness less than 0.1 mm because such thin products are very susceptible to biological attack. Further, the higher surface to bulk ratio of such thin products lead to faster degradation kinetics. The modified pellets of the present invention will not only increase the recycling usage of leftover regular plastic, but will also help reduce the cost of such recycled products.

Referring to Table 2, products of the present invention which have been processed with only biodegradable components are compared with products which have a non-biodegradable component added in order to slow the rate of biodegradation. All ten samples were made under similar conditions, and their biodegradability characteristics were compared. The processing and experimental conditions of the experimental samples were the same as in Table 1. The non-biodegradable component used was polyethylene, a compatible regular plastic that is generally not biodegradable.

TABLE 2

| | Embodiments (Soil: Black Soil) | | | | | | | | | |
| --- | --- | --- | --- | --- | --- | --- | --- | --- | --- | --- |
| | Biodegradable Product | | | | Product with Non-Biodegradable Component | | | | | |
| | 4 | 5 | 6 | 7 | 8 | 9 | 10 | 11 | 12 | 13 |
| a) thickness of molded product (mm) | 0.1 | 0.003 | 0.1 | 0.03 | 0.1 | 0.03 | 0.1 | 0.03 | 0.1 | 0.03 |
| b) coconut powder (wt. %) | 10 | 10 | 20 | 20 | 10 | 10 | 10 | 10 | 10 | 10 |
| c) biodegradable plastic (wt. %) | 90 | 90 | 80 | 80 | 80 | 80 | 70 | 70 | 60 | 60 |
| d) non-biodegradable plastic (wt. %) | — | — | — | — | 10 | 10 | 20 | 20 | 30 | 30 |
| e) rate of biodegradation (# days to 80% degradation) | 50 | 14 | 40 | 10 | 60 | 20 | 80 | 30 | 110 | 40 |

TABLE 2-continued

| | Embodiments (Soil: Black Soil) | | | | | | | | | |
|---|---|---|---|---|---|---|---|---|---|---|
| | Biodegradable Product | | | | Product with Non-Biodegradable Component | | | | | |
| | 4 | 5 | 6 | 7 | 8 | 9 | 10 | 11 | 12 | 13 |
| a) thickness of molded product (mm) | 0.1 | 0.003 | 0.1 | 0.03 | 0.1 | 0.03 | 0.1 | 0.03 | 0.1 | 0.03 |
| b) coconut powder (wt. %) | 10 | 10 | 20 | 20 | 10 | 10 | 10 | 10 | 10 | 10 |
| c) biodegradable plastic (wt. %) | 90 | 90 | 80 | 80 | 80 | 80 | 70 | 70 | 60 | 60 |
| d) non-biodegradable plastic (wt. %) | — | — | — | — | 10 | 10 | 20 | 20 | 30 | 30 |
| e) rate of biodegradation (# days to 80% degradation) | 50 | 14 | 40 | 10 | 60 | 20 | 80 | 30 | 110 | 40 |

The reduction of the biodegradation rate depends on the ratio of non-degradable components to the degradable components and on the thickness of the molded products. However, it can be seen that biodegradation rates could be reduced by over 20% through the controlled addition, in the present invention, of a non-biodegradable component to the biodegradable components.

Further tests were performed on the biodegradation of different forms of the product of the present invention. A biodegradable aliphatic polyester resin film of 45 μm thickness containing 5% coconut powder was manufactured by an inflation process and designated SF-005. A biodegradable aliphatic polyester resin pot of 100 μm thickness containing 5% coconut powder was manufactured by a vacuum formation process and designated SP-005F. The biodegradation of these products was measured and compared to a cellulose control, according to a standard ISO DIS Method 14855. The control material was pure cellulose powder for thin layer chromatography (Avicel; Merck). Briefly, test material (100 g cellulose; 60 g SF-005; 100 g SP-005F) was mixed with stabilized and mature compost derived from an organic fraction of municipal solid waste. The mixture was introduced into a static reactor vessel and composted at 58° C. under optimum conditions of moisture content and oxygen concentration for 45 days. The evolution of carbon dioxide was monitored. The cumulative carbon dioxide produced and the rate of carbon dioxide production were determined at 11 days, 41 days, and 45 days. Biodegradation was determined as both an absolute percent of carbon conversion into $CO_2$ and as a percent of the control carbon conversion. The results are shown in Table 3.

TABLE 3

| Sample | | Control | SF-005 | SF-005F |
|---|---|---|---|---|
| Carbon Content (% C) | | 42.6 | 55.8 | 56.4 |
| Biodegradation - 11 days | Net $CO_2$ production (mg $CO_2$/g) | 775 | 330 | 568 |
| | Biodegradation (% C conversion) | 49.7 | 18.0 | 31.0 |
| | Biodegradation (% relative to control) | 100.0 | 36.2 | 62.4 |
| Biodegradation - 41 days | Net $CO_2$ production (mg $CO_2$/g) | 1275 | 1405 | 1576 |
| | Biodegradation (% C conversion) | 81.7 | 68.7 | 76.2 |
| | Biodegradation (% relative to control) | 100.0 | 84.1 | 93.3 |
| Biodegradation - 45 days | Net $CO_2$ production (mg $CO_2$/g) | — | — | — |
| | Biodegradation (% C conversion) | 83.3 | 70.2 | 77.6 |
| | Biodegradation (% relative to control) | 100.0 | 84.3 | 93.2 |

Referring to Table 3, both SF-005 and SF-005F were more than 70% degraded, based on carbon conversion, after 45 days. These values compare favorably with the extent of cellulose breakdown over the same period (84.3% and 93.2% of the control breakdown, respectively).

Figure 5:
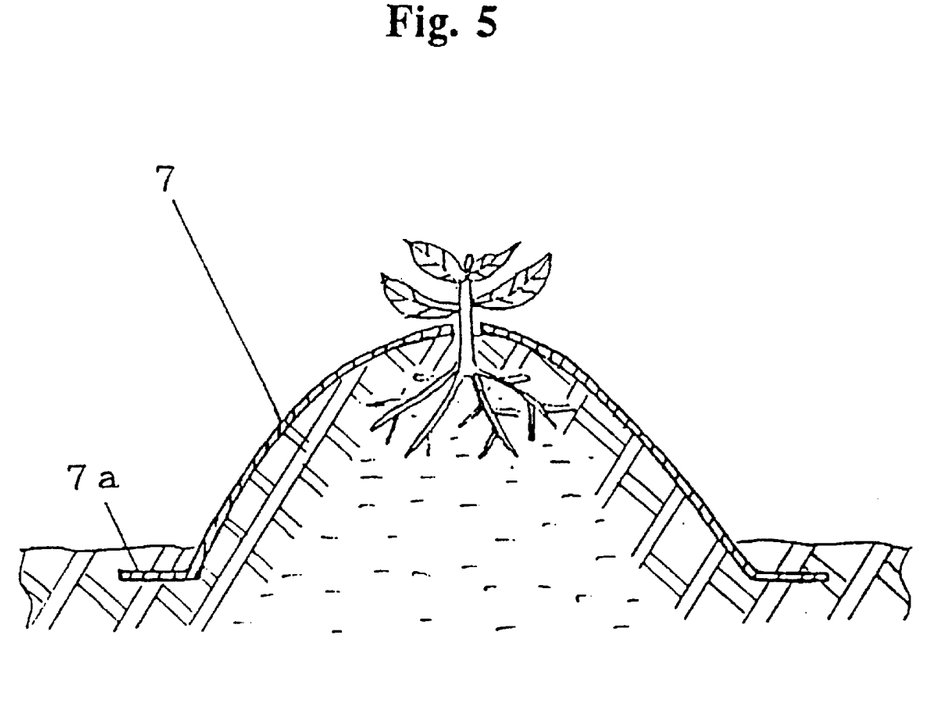
FIG. 5 is a drawing showing the ground placement of a film, made of the biodegradable plastic of the present invention, used for a ground covering in the cultivation of plants.

Referring to FIG. 5, in an application such as vegetable cultivation, a plastic film can be used as a covering 7 which acts as a mulch. As can be seen from the figure, contact area 7a is buried in the soil. Thus, contact area 7a is in greater contact with the soil than the remaining part of covering 7. Consequently, contact area 7a potentially will breakdown earlier than the remaining part of covering 7.

In order to prevent invasion of harmful vegetable fungi and bacteria from contact area 7a, the degradation rate can be modulated as above by adding an increased amount of non-biodegradable component to the contact area 7a section.

In another embodiment of the present invention, a pesticide is mixed with the other components of the biodegradable blend of the present invention. The pesticide is slowly released into the soil as the biodegradable product degrades. Thus, mixing 1 to 2% by weight of a pesticide into the biodegradable product of the present invention can solve the problem of maintaining a constant level of agricultural chemical in the application area where other attempts have been inadequate.

The present invention of the biodegradable plastic product made from coconut husk fine fiber powder mixture utilizes a fast degrading coconut powder made from coconut fine fibers which are produced in large quantity in the tropics. Such fine fibers presently are generally discarded because they have not yet been found useful for industry.

By mixing a biodegradable plastic with the coconut powder, the present invention discovered that biodegradability and processability is heightened. As a result, products can be made thicker. Furthermore, because the coconut powder has a high degree of hardness, resiliency, and water absorption, the present invention can result in a product with a strong mechanical rigidity. The present invention furthermore makes the technical innovative demonstration that regular plastic which is non-biodegradable can be very advantageously used as a degradation rate modulator.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A biodegradable plastic product, consisting essentially of:

from about 95 to about 60% by weight of a biodegradable plastic; and from about 5 to about 40% by weight of a dried powder, said dried powder being produced from the fine fibers of a coconut mesocarp.

2. A biodegradable plastic product according to claim 1, wherein said biodegradable plastic product further includes about 1 to about 2% each by weight of at least one member selected from the group consisting of a surface active agent and a pesticide.

3. A biodegradable plastic product according to claim 1, wherein said biodegradable plastic product further includes about 5 to about 10% by weight of a colorant.

4. A biodegradable plastic product according to claim 1, wherein said biodegradable plastic is an aliphatic polyester.

5. A biodegradable plastic product according to claim 1, further includes about 5 to about 40% by weight of an environmentally non-degradable plastic.

6. A method of making a biodegradable plastic product, comprising the steps of:

making a mixture, said mixture consisting essentially of
A) from about 95 to about 60% by weight of a biodegradable plastic, and
B) from about 5 to about 40% by weight of a dried powder, wherein said dried powder is produced from the fine fibers of a coconut mesocarp.

7. A method of making a biodegradable plastic product according to claim 6, further comprising the steps of:

separating a fine fiber component from a coconut;

removing substantially completely a contaminant component from said fine fiber component, said contaminant component comprising at least one of a salt and a tannin, to produce a cleaned fine fiber mass;

drying said cleaned fine fiber mass to a water content of less than about 10 wt % to produce a dried fine fiber mass;

compressing said dried fine fiber mass to produce a compressed fine fiber mass;

processing said compressed fine fiber mass to produce a powder having particle lengths of from about 10 to about 80 microns; and drying said powder to a water content of less than about 3 wt % to produce said dried powder.

8. A method of making a biodegradable plastic product according to claim 6, wherein said biodegradable plastic is an aliphatic polyester.

9. A method of making a biodegradable plastic product according to claim 6, wherein said mixture further includes about 1 to about 2% by weight of at least one member selected from the group consisting of a surface active agent and a pesticide.

10. A method of making a biodegradable plastic product according to claim 6, wherein said mixture further includes about 5 to about 10% by weight of a colorant.

11. A method to make a biodegradable plastic product according to claim 6, wherein said mixture further contains from about 5 to about 40% by weight of a non-biodegradable plastic.

* * * * *